(12) United States Patent
Tandy et al.

(10) Patent No.: US 8,033,716 B1
(45) Date of Patent: Oct. 11, 2011

(54) REFRIGERATION TEMPERATURE MONITORING SYSTEM AND ASSOCIATED TEMPERATURE DISPLAY

(76) Inventors: Troy Marcus Tandy, Lincoln, CA (US); Phil Wiggins, Davis, CA (US)

( * ) Notice: Subject to any disclaimer, the term of this patent is extended or adjusted under 35 U.S.C. 154(b) by 614 days.

(21) Appl. No.: 11/509,098

(22) Filed: Aug. 23, 2006

(51) Int. Cl.
*G01J 5/08* (2006.01)
*G01K 1/06* (2006.01)
*F25B 49/00* (2006.01)

(52) U.S. Cl. ........ 374/131; 374/141; 340/585; 340/506; 62/129; 356/43

(58) Field of Classification Search ................ 374/120, 374/121, 130, 135, 137, 208, 163, 183, 170, 374/161, 162, 29, 30, 166, 124, 152, 149, 374/100; 356/237.1, 923, 43; 359/30; 340/500, 340/501, 506, 507, 584, 585, 600, 340.17; 62/45.1, 125, 129, 264, 246, 440; 345/156, 345/204, 207, 48, 106
See application file for complete search history.

(56) References Cited

U.S. PATENT DOCUMENTS

| | | | | |
|---|---|---|---|---|
| 4,542,987 A * | 9/1985 | Hirschfeld | ........................ | 356/44 |
| 4,790,669 A * | 12/1988 | Christensen | .................... | 374/131 |
| 4,906,949 A * | 3/1990 | Pocholle et al. | ........... | 359/341.33 |
| 5,306,912 A * | 4/1994 | Sibbald et al. | ................... | 250/334 |
| 5,444,227 A * | 8/1995 | Chestnut | ........................ | 219/506 |
| 5,499,313 A * | 3/1996 | Kleinerman | .................... | 385/123 |
| 5,769,540 A * | 6/1998 | Schietinger et al. | ............ | 374/127 |
| 5,928,222 A * | 7/1999 | Kleinerman | ....................... | 606/16 |
| 6,378,315 B1 | 4/2002 | Gelber et al. | | |
| 6,453,687 B2 | 9/2002 | Sharood et al. | | |
| 6,690,344 B1 * | 2/2004 | Takeuchi et al. | .................. | 345/85 |
| 6,798,341 B1 * | 9/2004 | Eckel et al. | ..................... | 340/521 |
| 6,833,531 B1 * | 12/2004 | Masaki | .......................... | 219/241 |
| 6,902,318 B2 * | 6/2005 | Watanabe | ...................... | 374/141 |
| 6,956,337 B2 | 10/2005 | Kemper | | |
| 7,377,689 B2 * | 5/2008 | Balan | ............................ | 374/152 |
| 7,402,808 B2 * | 7/2008 | Rose et al. | ...................... | 250/368 |
| 7,429,983 B2 * | 9/2008 | Islam | ............................ | 345/204 |
| 2002/0047546 A1 * | 4/2002 | Kayser | ........................... | 315/117 |
| 2002/0156380 A1 * | 10/2002 | Feld et al. | ....................... | 600/473 |
| 2005/0041245 A1 * | 2/2005 | Lossau | ........................... | 356/311 |
| 2005/0043907 A1 * | 2/2005 | Eckel et al. | ...................... | 702/62 |
| 2007/0047617 A1 * | 3/2007 | Thorne et al. | .................. | 374/163 |
| 2008/0198896 A1 * | 8/2008 | Nair | .............................. | 374/141 |
| 2011/0069091 A1 * | 3/2011 | Kim et al. | ...................... | 345/690 |

FOREIGN PATENT DOCUMENTS

| | | | |
|---|---|---|---|
| DE | 19850681 A1 * | 5/2000 | |
| JP | 02208529 A * | 8/1990 | |
| JP | 2000340398 A * | 12/2000 | |

* cited by examiner

*Primary Examiner* — Gail Verbitsky
(74) *Attorney, Agent, or Firm* — John P. Costello; Costello Law Corp.

(57) ABSTRACT

The invention is a system for monitoring a plurality of cold cases located in a retail food establishment. The system employs a wireless mesh network, which uses monitoring computers in communication with the cold cases for sending temperature data to a master control computer located in a retail establishment, by the most efficient route, even if the most efficient route is first through a second monitoring computer and secondly to the main computer. The invention also employs an inventive microprocessor-controlled temperature monitoring and display device which mounts on each cold case and which emits various colored lights to serve as a visible indicator of the temperature condition of a cold case. The emitted, colored, light is visible from both the front and side of the display device, which allows untrained store personnel to readily determine the temperature condition of a cold case by referring to a color coding chart.

6 Claims, 5 Drawing Sheets

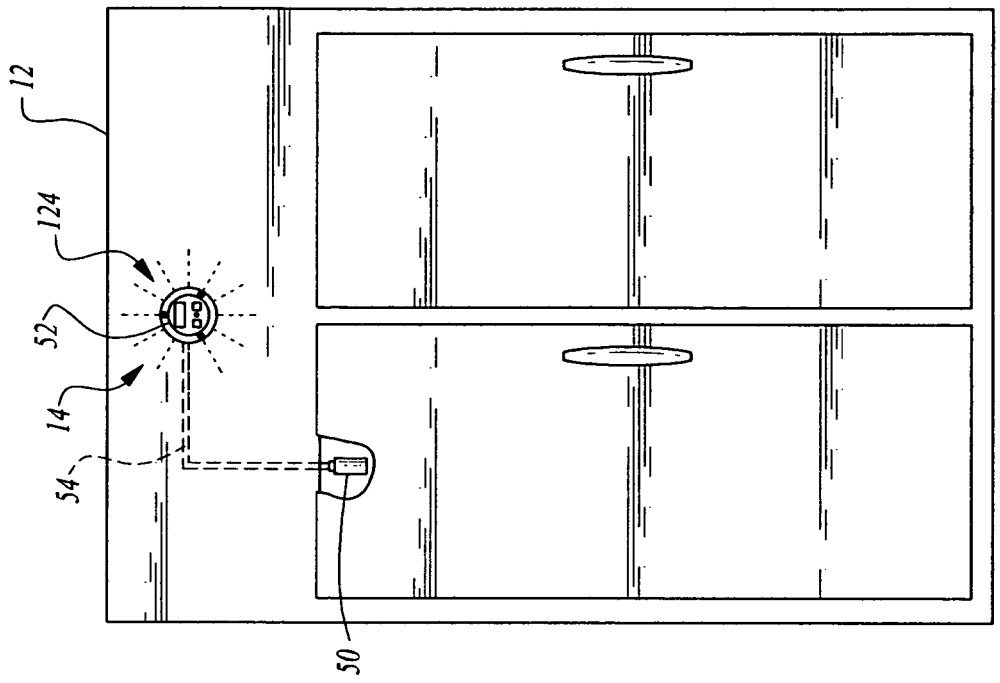
Fig. 2
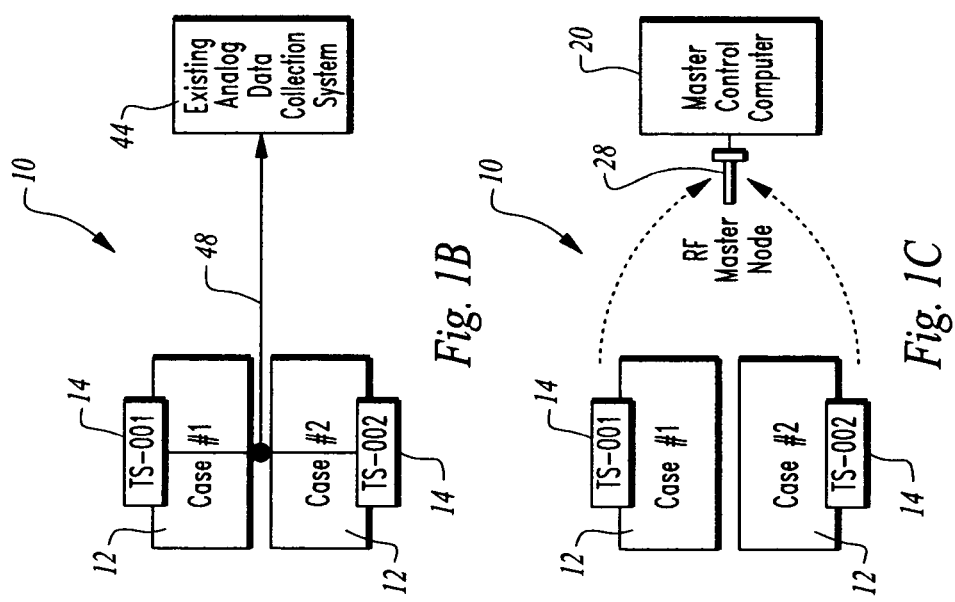
Fig. 1B
Fig. 1C

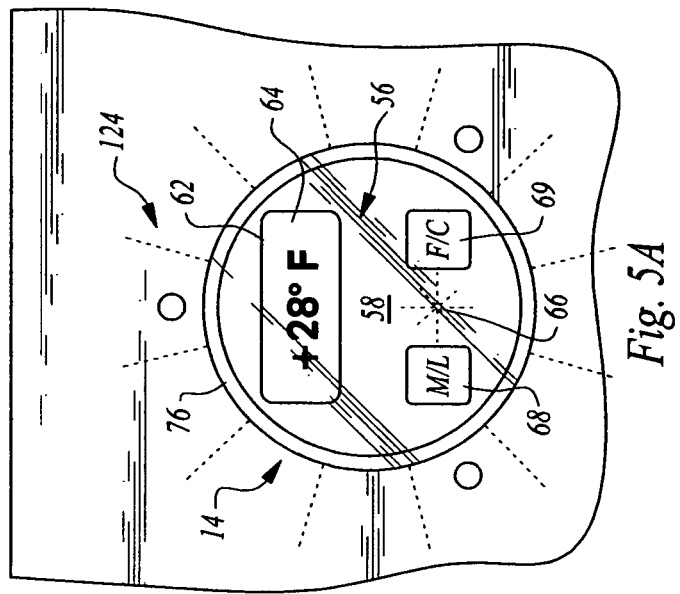
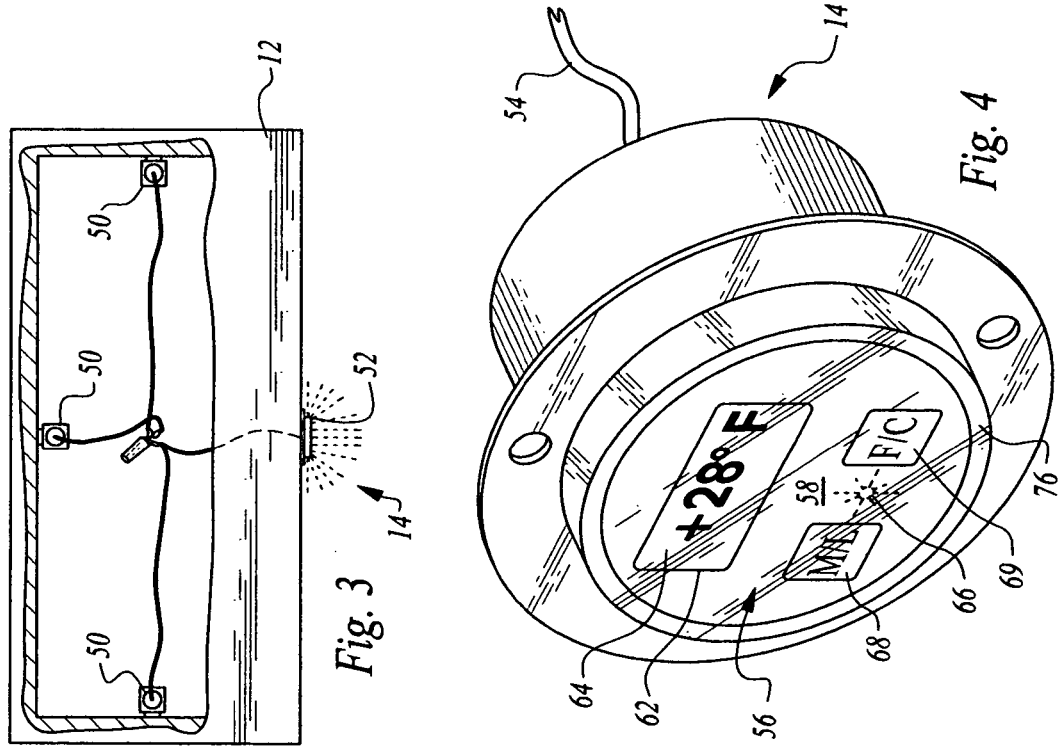

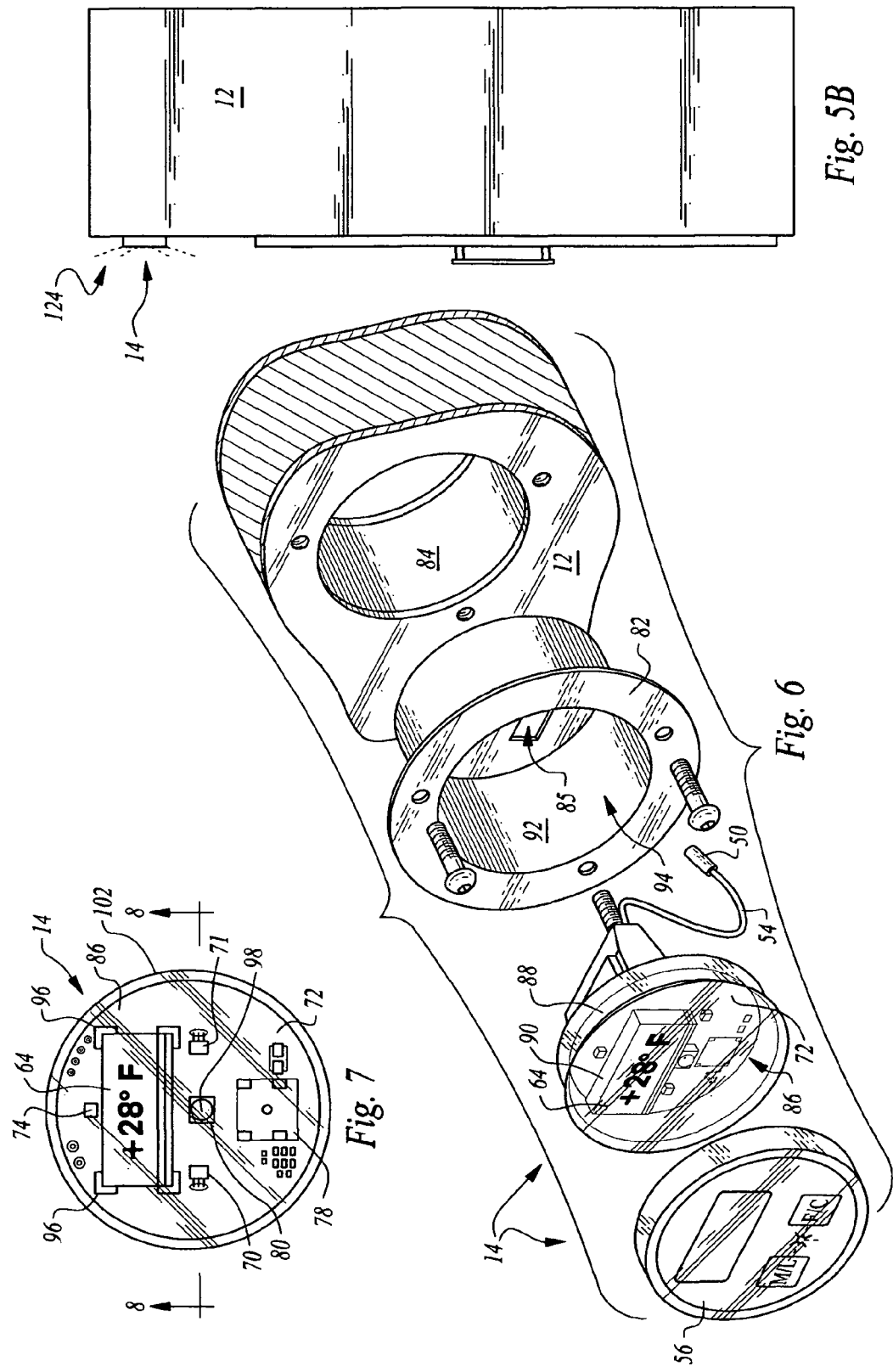

REFRIGERATION TEMPERATURE MONITORING SYSTEM AND ASSOCIATED TEMPERATURE DISPLAY

1. TECHNICAL FIELD

This invention relates to the field of refrigeration systems, and more particularly, to a system for warning of temperature related inefficiencies or dysfunctions occurring in a refrigeration system.

2. BACKGROUND

Refrigeration systems or "cold cases" are a necessary part of modern food retailing. These systems function to both keep fresh food cold or else to freeze food, depending on the temperature at which the system is set. Depending on the demand for certain types of foods, food retailing establishments regularly change the temperature settings of their systems to accommodate these changing demands. Typically, supermarkets contain, on average, about 75 refrigerated cases per store. A system for monitoring such a large number of cases is essential in order to maintain proper temperature, and therefore optimal food quality, for as long as possible. Additionally, refrigeration monitoring systems are necessary to reduce food spoilage loss resulting from malfunctioning refrigeration cases.

Basic thermometers installed in each refrigeration case represent the most rudimentary monitoring solution employed in the food industry. These thermometers can be of the common dial or digital type. However, typically thermometers must be mounted inside of the refrigeration case for proper functioning, which makes them difficult to find, and more often than not they become hidden behind food merchandise. Also, thermometers require trained personnel to monitor them constantly and to be able to interpret the temperature readings. Additionally, power outages or technical malfunctions may cause a cold case to enter a defrost mode. Thermometers are often insufficient tools for alerting store personnel to the impact upon food merchandise caused by these defrost cycles. Also, thermometers often cease to function properly; a fact that often goes unnoticed when thermometers are hidden behind food merchandise. Health inspections commonly result in citations issued to replace damaged or broken thermometers, which result in follow up inspections that are costly for the retailer.

Due to the deficiencies inherent with thermometers, a majority of large food retailers have employed thermistors to sense temperature, which are remotely monitored by a computer, that is often located hundreds of feet away in a store's mechanical room. An example of such a system is seen in U.S. Pat. No. 6,378,315 issued to Gelber et al. The thermistors communicate to the computer via analog means, wherein the analog signal is transmitted by individual "point to point" single pair wire runs from the remote computer to each thermistor located in the cases. However, such systems are expensive to install due to the high labor costs involved in installing enough temperature sensors, as well as installing the large amount of wire required to accommodate the sensors. Furthermore, analog technology is susceptible to interference from fluorescent lighting which increases the greater the distance which the analog signal needs to travel. In an indoor retail establishment fluorescent lighting creates substantial interference with analog signals being transmitted over long wire lengths. In some large warehouse stores, the distance between the sensors and a practical location for a monitoring computer can be up to 1500 feet, in which case an analog system experiences many sensor faults and inaccuracies.

Current wireless offerings, such as that seen in the '315 Gelber patent have not been popular because of the cost and lack of reliability associated with these systems. These systems require that the temperature sensor located in a single case to be a standalone wireless device that communicates to the remote controller through a single transmitter to a repeater (recommended every 150') and finally to a master receiver which communicates this information to the controller. These sensor transmitters are battery powered and must have a line of site to the receiver or repeater in order to maintain communication. In a retail environment it is impossible to ensure that all 70+ transmitter sensors have a proper line of site upon installation. Also ongoing merchandising changes involving placing displays, hanging plants, or moving merchandise often places objects in the path of the line of site transmission, thereby blocking communication between the cold case sensors and the remote controller.

Furthermore, large refrigeration cases can be 12 feet in length, lending to the existence of separate cold zones having different temperatures. The same food merchandise placed in one optimal cold zone may experience deterioration in an adjacent cold zone having a temperature that is less than optimal. With health department standards becoming stricter, it is believed that monitoring separate cold zones present in the same refrigeration case will increasingly become an issue.

Therefore, a need exists for a refrigeration monitoring system which is capable of re-routing wirelessly transmitted signals around objects until a clear line of site can be achieved. A need also exists for a refrigeration monitoring system which allows the reliable monitoring of cold cases by untrained personnel and which is not susceptible to electrical interference problems inherent with analog systems. Furthermore, a system having the ability to monitor multiple cold zones located in the same refrigeration case would be desirable. In addition to these improvements, it would also be desirable to have a system which be installed with a minimal amount of wiring, thereby reducing system cost.

The foregoing reflects the state of the art of which the inventor is aware, and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE INVENTION

The invention is a refrigeration temperature monitoring system including an associated temperature display device. The temperature display is designed to be externally mounted upon each refrigeration case and it has both a visual LCD display for indicating temperature and also has a colored light emitter which can indicate any one of a number of temperature conditions, including alarm conditions, depending upon the color of the light being emitted. The light emitter on the temperature display produces multi-dimensional light, which is both visible from frontal and side views. This multi-dimensional lighting aspect allows store personnel to readily determine the condition of a refrigeration case by merely glancing down an aisle of cases and comparing the emitted colors to a color chart. The chart interprets the meaning of each color as it relates to cold case functioning. This color system allows even untrained personnel to monitor a store's refrigeration cases.

The temperature display is attached to a remote temperature sensor, which can be located inside of a refrigeration case up to 20 feet away. The display can operate in a stand-alone battery-powered mode, if it is being used in a small retail establishment, such as a convenience store or corner market. It can also be adapted to operate in large supermarkets and warehouse stores through usage of a hardwired (two-wire) or wireless network, which interfaces multiple displays with the store's computer-based temperature monitoring system. In such a multiple display configuration, the entire temperature monitoring system might employ 75 displays, or more. Each display has its own serial address to allow the main computer to easily communicate with individual displays. The system is based completely upon digital operation, which eliminates analog system errors.

The temperature display can also be readily adapted for monitoring separate cold zones which may be present in the same refrigeration case. For example, the display could be set up to monitor three, 4-foot cold zones, in a single 12-foot case.

BRIEF DESCRIPTION OF THE DRAWINGS

The invention will be more fully understood by reference to the following drawings which are for illustrative purposes only:

FIG. 1B is a diagram of a second embodiment of the inventive refrigeration temperature monitoring system showing the inventive temperature monitoring and display device employed as part of an existing hard-wired analog system.

FIG. 1C is a diagram of a third embodiment of the inventive refrigeration temperature monitoring system showing the inventive temperature monitoring and display device employed in a fully wireless format.

FIG. 2 is a frontal view of a cold case with the inventive temperature monitoring and display device shown mounted therein and showing the display device emitting light around its perimeter.

FIG. 3 is a plan view of a cold case shown with the top of the case cutaway to illustrate the placement of multiple serially addressed temperature sensors for sensing multiple cold zones in a cold case.

FIG. 4 is a close up front elevated perspective view of the inventive temperature monitoring and display device.

FIG. 5A is a close up frontal view of a cold case with the inventive temperature monitoring and display device shown mounted therein and showing the display device emitting light around its perimeter.

FIG. 5B is a side view of the display device and cold case of FIG. 5A showing the display device emitting light around its perimeter.

FIG. 6 is an exploded view of the major components which comprise the inventive temperature display device.

FIG. 7 is a front view of the housing, light guide and circuit board components of the inventive temperature display device with the cover removed.

DETAILED DESCRIPTION OF THE PREFERRED EMBODIMENTS

Figure 1A:
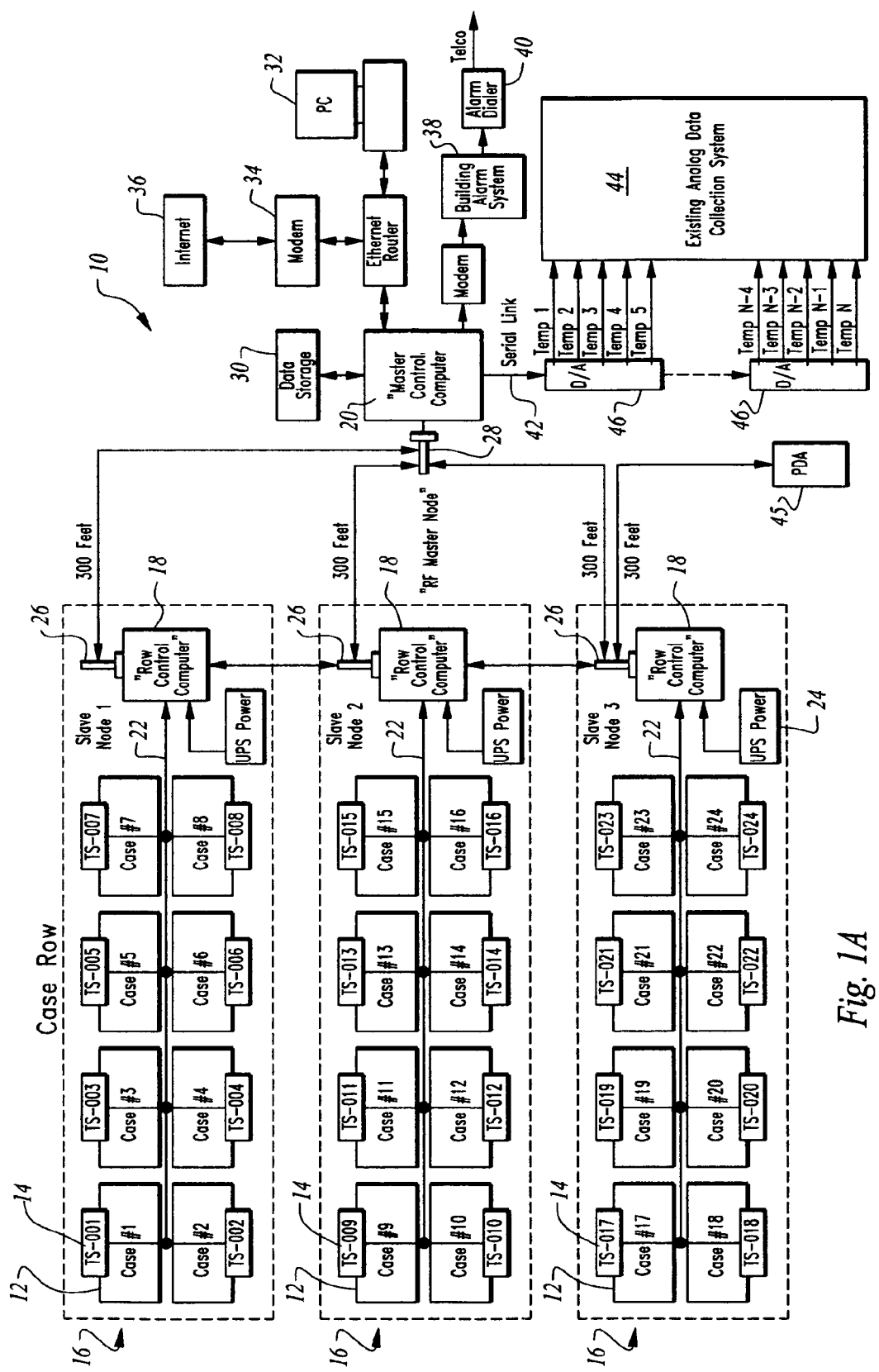
FIG. 1A is a diagram of a first embodiment of the inventive refrigeration temperature monitoring system showing the communication of temperature data through a wireless mesh network.

Referring to FIG. 1A, an overview of the inventive refrigeration temperature monitoring system 10 is shown as it might appear in operation at a large retail food establishment. In this example there are 24 total cold cases 12 where each case employs its own temperature display 14, and the cold cases 12 are divided up into rows 16 of eight cases each. The monitoring system 10 could be expanded to monitor any number of cold cases, which is especially crucial in large warehouse retail establishments, such as Costco® stores, where there might be 75 cases or more to monitor. Each temperature display has its own identifying serial address (TS-001, TS-002 . . . TS-024) so that any individual temperature display 14 can be readily identified to determine the particular temperature condition of a cold case 12. The sensors have a unique-in-the-world 64-bit digital ID, which is programmed into them that allows $1.8 \times 10^{19}$ possible sensor IDs. This provides for individual identification of each display unit 14 without the possibility of error. Each temperature display operates as a stand-alone temperature monitoring system, which can flash a light indicating an alarm condition on a malfunctioning cold case 12. The advantage of this is that an alarm condition can be identified almost immediately by untrained store personnel, who notice the flashing alarm light of the display device. Prior art monitoring systems typically kept their alarm indicators located in the mechanical room of a food retail store or else would subcontract their cold case monitoring duties to an off-site company. In each of these prior art situations, it might take too long before an alarm condition is noticed or relayed to the proper personnel, thus increasing the chance for food spoilage to occur.

Still referring to FIG. 1A, a row control computer 18 is associated with each row 16 of cold cases 12, which collects temperature information sent by the display device 14 located on each cold case 12. The temperature information sent by the display devices could be information relating to whether a particular cold case is operating at optimum efficiency, or information on whether an alarm condition has been indicated by the display device. An RS-485 standard network computer, produced by Refrigeration Innovation, Inc. of Woodland, Calif. has been designed for the role of a row control computer 18, which accomplishes the functions of 1) data collection computer and 2) data server, to the master control computer 20 which is preferably located in the mechanical room of a retail establishment. The row control computer 18 has been designed with an uninterruptible power supply system 24 (UPS) which is a rechargeable battery system that provides temporary power to the temperature display devices 14 attached to it through the network wiring 22 in the event of a store power outage. This UPS system 24 maintains continuous monitoring of the cases 12 by the display devices 14 during a power outage. Each computer 18 is hardwired via a short run, eight-wire link 22 to each display device 14 in the row of cases 12. Temperature and status information, along with power are carried along this link between the row control computer 18 and the temperature displays 14. The power portion of this link 22 is of a double-redundancy design so that should a first power line be disabled, a second line will still be available In the system shown in FIG. 1A, an RF slave node 26 is associated with each row control computer 18, which wirelessly transmits the collected temperature information from a row of cases 16 to an RF master node 28 associated with a master control computer 20. RF slave nodes manufactured by MaxStream, Inc. and having model designations XBEE and XBEE Pro have been found to meet the requirements of the invention. These RF slave nodes are based upon a Zigbee™ wireless platform, which is operated by software to allow the Zigbee™ slave node 26 to be adapted to a serially addressed format. The software resides on the row control computers 18 and the master control computer 20. Zigbee™ is now a worldwide standard published by IEEE and supported by the Zigbee™ Alliance and is incorporated by reference herein; this standard being available for download at www.ZigBee.org. The advantages of Zigbee™ in the context of the invention are that it is capable of dynamically re-configuring the network to bypass dead-air zones; it is designed specifically for low data rate sensor systems; and it is designed to operate at ultra low power levels to allow operation on batteries for years. Present art Zigbee™ transceivers can transmit up to 300 feet indoors and up to 1 mile line-of-sight outdoors.

The transmission of information between the Zigbee™ slave node 26 and the master node 28 is handled through a wireless mesh network, which transmits an RF signal from the row control computers 18 to the RF master node 28 in the most efficient manner. Depending upon which route of transmission has the highest signal strength, the RF signal may be transmitted directly between a row control computer 18 and the RF master node 28 or else the signal can be transmitted first between two (or more) slave nodes 26 and finally to the master node 28. A software program loaded on the row control computers determines the most available route of transmission to the master node. This software is part of the Zigbee™ mesh networking protocol and is provided by the Zigbee™ slave node transceiver manufacturer. The advantage of using a mesh network with the inventive system is that if a signal being transmitted from the row control computer 18 to the master node 28 is prevented from reaching the master node, the system can re-route the signal through other row control computers 18 until a clear line of transmission from a row control computer 18 to the master node 28 is achieved. This feature of a mesh network is especially important where electronic interference or physical structures located in a store may block the line of sight transmission of an RF signal between the row control computer 18 and the master control computer 20. The master node 28 transmits the temperature information from the cold cases 12 to the master control computer 20, which is a web server in its preferred form.

The inventive system 10 is designed to be completely digital throughout, which has been found to be a more reliable format than analog systems. It has been found that prior art wired analog systems are susceptible to electronic interference from fluorescent store lighting which reduces their effective wired transmission range to about 500'. While this range is fine for smaller retail establishments, it is inadequate for large warehouse style stores where distances of up to 1500' may separate the row control computers 18 from the master control computer 20. Furthermore, currently available wireless systems of the type described in U.S. Pat. No. 6,378,315 (issued to Gelber, and incorporated by reference herein) suffer from the woes of single point to point communication on narrow unsuitable frequency bands that can suffer from radio frequency interference emitted by other devices. Zigbee™ allows for 16 different bands to communicate on Zigbee™ transceivers, which will sample the radio energy on successive channels. When a channel is found having a minimal amount of radio interference, and therefore a higher signal to noise ratio, better communication is afforded. The digital Zigbee™ individual nodes have been found to transmit digital data for distances of up to 300' indoors, without the use of repeaters, and without interference from fluorescent store lighting. By placing enough slave nodes 26 between the row control computer 18 and the RF master node 28, long transmission distances can be spanned by relaying an RF signal between nodes until a desired distance is reached. By relaying signals between nodes, reaching distances of 1500' indoors in the largest retail establishments is easily achievable.

The master control computer 20 can route the temperature information received from the row control computers 18 to a plurality of destinations such as a local data storage device 30 or to one or more on-site PCs 32. The on-site PCs 32 could, for example, be located in a kiosk on the floor of a store to allow ready access to temperature information by store personnel. Alternatively, the master control computer 20 can send temperature data over the internet 36 via dial-up modem 34. If a temperature in a cold case 12 has reached an alarm condition, the master control computer 20 can also signal the store alarm system 38 via a relay which can further dial out 40 to an off-site alarm to warn store personnel to check the condition of a malfunctioning cold case. A PDA 45 can also be used to receive wireless information from the row control computers 18 and operate to make any changes to the display devices 14 through the row control computers 18.

The master control computer 20 can also route the temperature information via a serial link 42 to an existing control system 44 that is usually located in the mechanical room of the retail establishment. Existing control systems 44 are typically analog in operation and are exemplified by systems manufactured by CPC, Inc. of Atlanta Ga., some of these systems being described in U.S. Pat. Nos. 6,668,240 and 6,378,315. Additional exemplary control systems 44 are those offered by MicroThermo Corporation of Canada. Although the CPC and Micro Thermo systems are analog and the invention is digital, the invention is readily adaptable to these systems through software and hardware interfaces 46, which accomplish the conversion of information between analog and digital operation. These interfaces 46 are within the skill of the art to create and require no further discussion.

Referring now to FIG. 1B, the inventive system 10 and display device 14 is also capable of allowing a retail food establishment to migrate from full analog operation to digital wireless communication. For retail owners who would like to keep their wired analog infrastructure 44, the inventive display device 14 is capable of providing an analog signal representing temperature that can be connected to existing analog sensor wiring 48 by using an analog sensor input. As budgets permit, retail owners can gradually upgrade their systems to digital wireless operation by adding components of the system (e.g. display devices, row control computers, Zigbee™ nodes, master control computer).

Alternatively, as shown in FIG. 1C, the inventive display device 14 is also capable of operating completely wirelessly in digital format through the addition of a low-power transceiver to the circuit board of the display device 14, which operates from battery power. This system transmits digital temperature information, utilizing the previously noted Zigbee™ wireless mesh network, to a master control computer 20 without the use of the aforementioned row control computer. This system is ideal for small convenience stores that wish to save the cost of hardwiring and row control computers, yet desire to have a completely digital temperature monitoring system 10.

Referring now to FIG. 2, the temperature monitoring display device 14 is shown, as it would be mounted on the face of a cold case 12. The device 14 is preferably round in configuration, with a 2" diameter, so that it can be mounted in the same location as 2" diameter dial thermometers which are an industry standard. For example, the device would replace Weiss instruments 20fb or bb series thermometers. The device 14 can also be adapted to other shapes, such as rectangular or oval.

The serially addressed sensor 50 is attached to the display portion 52 of the device 14, by wire 54, and the wire and sensor are mounted inside of the cold case 12 at any desired remote location. By associating a serial address with each sensor 50, the performance of a cold case 12 can be monitored, as the temperature at each sensor can be readily determined by reference to its serial address. The remote sensor 50 can be mounted up to 20 feet away from the display portion 52 and has an accuracy of ±½° C. The wire 54 can be spliced to add sensors 50 via multi-drop, daisy-chain or star configurations as shown in FIG. 3. The sensors can be placed at different locations throughout a case 12 if it is desired to monitor different cold zones inside of a cold case. As shown in FIG. 3, three sensors 50 are mounted at different cold zone locations inside of a 12-foot cold case. In a malfunctioning cold case, there can be zones which are operating at proper temperature ranges, while other zones are not. The inventive display device 14 can detect such sub-optimal cold zones and trigger an alarm condition, if necessary. Such a sub-optimal cold zone would often remain undetected with prior art monitoring devices, thus leading to food damage in the sub-optimal cold zone. Another usage of multiple sensors 50 would be to employ a two-sensor setup where one sensor monitors inlet air and the other monitors outlet air in a cold case. This setup would be used to determine the temperature differential across a cold case to determine the amount of heat energy loss, which is another measure of cold case efficiency.

FIG. 4 shows the display device 14 as it appears during normal operation. The face of the device 14 is also a cover which attaches to a light guide, in a manner which will be discussed further, below. The light guide and cover are preferably molded of clear plastic. The cover 56 includes a center portion 58, which reflects light back into the light guide. The light reflecting center portion 58 can be created by applying a lexan label in a preferred thickness range of 3 to 9 thousandths of an inch. If a lexan label comprises the center portion 58, the cover 56 includes a recess 60 (see FIG. 9) to allow the flush placement of the label on the underside of the cover. The center portion 58 has a cut-out display window 62 for viewing the LCD temperature display screen 64 and a small viewing port 66 for viewing the operation of an underlying LED. Switch indicators 68, 69 are printed on the center portion 58 which overlies magnetic switches 70, 71 located on the circuit board 72 (See FIG. 7). These switches 70, 71 can be activated from the face of the device 14 using a magnetic wand (not shown). This allows store personnel to manually program the display from the face of the device 14, in addition to allowing the device to be programmed from a remote location through the mesh network via a communications port located on the device 14.

Referring still to FIG. 4, a first switch indicator 69 overlies a magnetic switch 71 that allows the device 14 to be switched to either Fahrenheit or Centigrade operation. A second switch indicator 68 overlies a magnetic switch 70 that allows the temperature set points for multiple temperatures, most notably medium (fresh) and low (frozen) temperature ranges to be set and displayed. A third magnetic switch 74 is incorporated into the circuit board 72 of the device 14 (see FIG. 7), but the center portion 58 of the cover 56 does not include a switch indicator for this switch 74. This switch 74 is not indicated because this third switch 74 is a program function switch, that allows for configuration changes such as for the medium and low set points to be changed. Keeping the location of the third switch hidden helps prevent casual tampering of the display device.

The area exterior to the center portion 58 comprises the translucent exterior edge 76 of the cover 56. The exterior edge 76 provides a light scattering function which is accomplished by texturing the surface of the plastic injection mold, from which the cover is made, to impart a frosted texture to the cover part when it is manufactured. The net effect is that light traveling through the cover's edge 76 scatters, and creates a glowing ring of light emitting radially) (360° around the device 14, which can be easily viewed from the front as well as the side of the display device 14 as shown in FIGS. 5A and 5B respectively (dotted lines indicate light rays). This multi-dimensional quality of the emitted light offers the advantage of allowing store personnel to walk past aisles of cold cases 12 and view the temperature condition of each case at a glance. For example, when a case 12 is in the low temperature (e.g. freeze) mode, the temperature display 14 can be lit with a blue color; when set for medium temperature (e.g. fresh) mode it can be lit with a green color; and when the case 12 is in defrost mode the color can be violet. When a case 12 is in an alarm condition, the display 14 can flash a red color to notify store personnel of the need for service. The embedded software on the microprocessor 78 of the display device 14 decides which color should be emitted from the LED 80 for each temperature condition. The LED is capable of emitting a variety of colors which are generated from primary color LED chips corresponding to red, blue and green in a manner already known in the art. This feature of the invention allows store personnel to determine the temperature condition of a cold case 12 by using a color chart, rather than having to understand temperature ranges and how they affect refrigerated food.

Referring to FIG. 7, the microprocessor 78 is preferably a microcontroller having stand-alone built in data memory and program memory along with input and output port capability. The functions which the microprocessor 78 performs includes the function of interpreting temperature condition and assigning a color to indicate the condition; the function of indicating alarm conditions through both visual (colored light) and audio alarm means; and the function of transmitting temperature data to remote computers (row control 18 and master computers 20) through data output ports.

FIG. 6 shows an exploded view of the major components which comprise the inventive temperature display device 14. A metallic housing 82 inserts into the front face of a cold case 12. The housing is inserts into the same 2" diameter hole that is left by the removal of a standard dial thermometer. The housing 82 has a through-hole 85 located in its rear wall for threading the temperature sensor 50 and wire 54. A light guide 86 is attached to a circuit board 72 containing the electronic components of the device 14. The light guide 86 is separated from the circuit board 72 by a radial wall 88, wherein the light guide 86 and light guide wall 88 are an integrally molded piece. The LCD screen 64 and a compressible rectangular foam piece 90 are sandwiched between the top surface of the circuit board 72 and the undersurface of the light guide 86. The cover 56 engages with the light guide 86, and the exterior surface of the radial wall 88 of the light guide frictionally engages with the inner wall 92 of the housing cavity 94 for a snug fit, to complete the assembly.

FIG. 7 is a front view of the, light guide 86 and circuit board 72 of the display device 14, with the cover 56 removed. Four corner guides 96 molded to the undersurface of the light guide 86 properly position the corners of the LCD screen 64 and foam piece 90 onto the circuit board 72. Imparted into the face of light guide 86 is a downward-extending conical cavity 98, which is positioned directly above the LED light source 80. The conical cavity directs light toward the exterior edge 102 of the light guide 86 in a manner which will be described further below. The magnetic switches can be seen through the light guide, the switches being the Fahrenheit to Celsius switch (F/C) 71, the medium and low set point switch (M/L) 70 and the programming mode function switch 74. When each magnetic switch is activated using a magnetic wand, a separate flashing light color is emitted by the LED 80 to visually indicate that the switch has been activated. For example, activating the M/L switch 70 will cause the LED 80 to flash a green indicator light and the set point for medium or low operation will flash on the LCD screen 64. If, for example, it is desired to change the medium set point, to the low set point, the programming mode switch 74 is activated (blue light) and the M/L switch 70 is activated, which causes the pre-programmed set point to be changed and displayed. While the displayed set-point is flashing, successively triggering the M/L switch 70 will cycle through the pre-programmed available set-points. Removing the magnetic wand from the M/L switch 70 will cause the displayed new set point to flash on the screen 64 three times and stop, indicating that the device 14 is operating at the new set point.

While the act of switching between set points can be accomplished either from a remote store location or from the face of the device using a magnetic wand, the inventive device 14 can also be made to sense when a cold case 12 is being switched between medium and low operation and automatically adjust the medium and low set points, accordingly. Some cold cases are manually switched at the case between medium and low operation. The manual switching function is accomplished with a solenoid or a switch with an auxiliary contact. An example is the Costco® Dual Temp™ cold case, which has a manual switch that actuates a solenoid associated with the coolant system of the cold case. When the solenoid is actuated it places the case 12 in low operation mode and when it is de-actuated, the cold case 12 operates in medium mode. The inventive display device 14 uses a relay attached to the Dual Temp™ solenoid to sense when the solenoid has been actuated or de-actuated, and the software program of the inventive device 14 automatically changes the M/L set points to the same mode as the cold case 12. Regardless of whether the medium and low set points are programmed manually or automatically, the software in the display device 14 also re-programs the alarm set points when the case set points are changed. For example, if the case is re-programmed from a low set point of 5° F. to a medium set point of 40° F., the new alarm set point of 40° F. would simultaneously be set.

Another feature of the device 14 is the output of a unique color and display of the letters "dEF" to indicate a defrost condition. This prevents customers from seeing elevated case temperatures experienced during defrost mode. For instance, freezer cases with a 20 minute hot gas defrost will terminate at 75° F. This temperature is not damaging to the product for such a short period of time and is not an accurate representation of the food product temperature. Therefore it is beneficial to prevent unnecessary alarms during defrost cycles. The device software senses a temperature increase with respect to the current alarm setting and starts the dEF function. Upon return to temperature within a set time period the unit 14 returns to normal operation. If the case temperature remains above the alarm set point beyond the prescribed defrost period the unit 14 will go into alarm mode.

Figure 8:
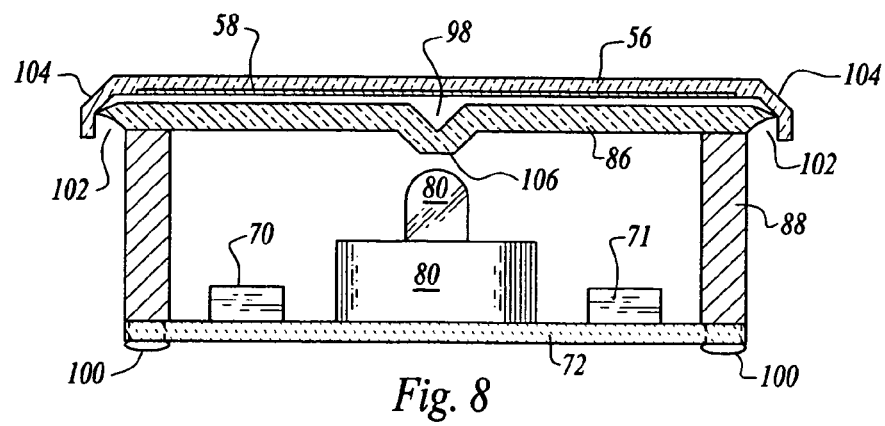
FIG. 8 is a cross section through the inventive temperature display device at line 8-8 of FIG. 7.

The LED 80 and magnetic switches 70, 71 are shown attached to the circuit board 72 in FIG. 8. The round light guide wall 88 and light guide 86 form a single, integral piece, wherein the wall 88 extends downward from the light guide 86 and fastens to the circuit board 72. This piece is molded from clear plastic in the preferred embodiment. The preferred method of fastening the light guide wall 88 to the circuit board 72 is to extend plastic pegs 100 from the bottom of the wall, the pegs 100 engaging in holes imparted in the circuit board 72. The portions of the pegs which protrude through the circuit board are heat riveted to the underside of the board, thus completing the fastening procedure. The distance between the bottom surface of the light guide 86 and the top surface of the circuit board is such to create a perfect tight sandwiching fit of the LCD screen 64 and foam pad 90 there between.

Figure 9:
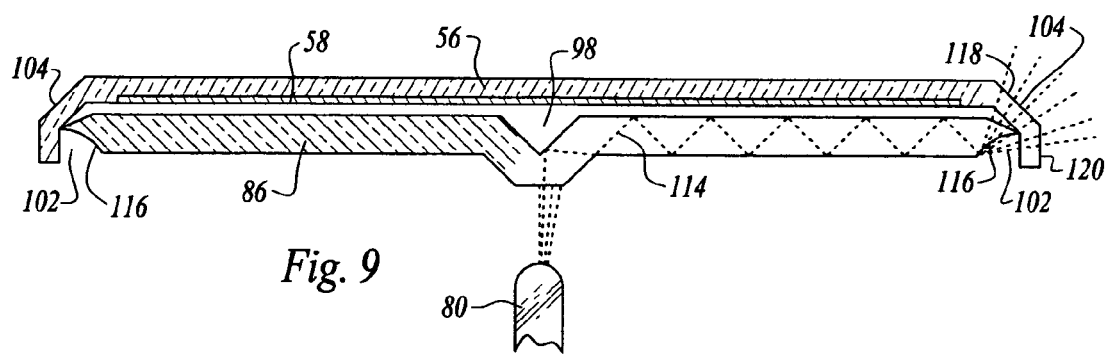
FIG. 9 is a cross section through the light guide, cone and cover of the inventive temperature display device.

As shown in FIG. 9, the function of the light guide 86 is to redirect radiant light received from the LED 80 toward the exterior edge 102 of light guide 86 in a radial) (360° manner. The exterior edge 102 of the light guide 86 is shaped to scatter light (broken lines) into the exterior edge 104 of the light cover 56. As noted previously, the light cover exterior edge 104 is frosted to further enhance light scattering properties. The light redirecting function is initially accomplished by the conical cavity 98 and an inverted beveled plateau 106 extending from the bottom surface of the light guide 86.

Figure 10:
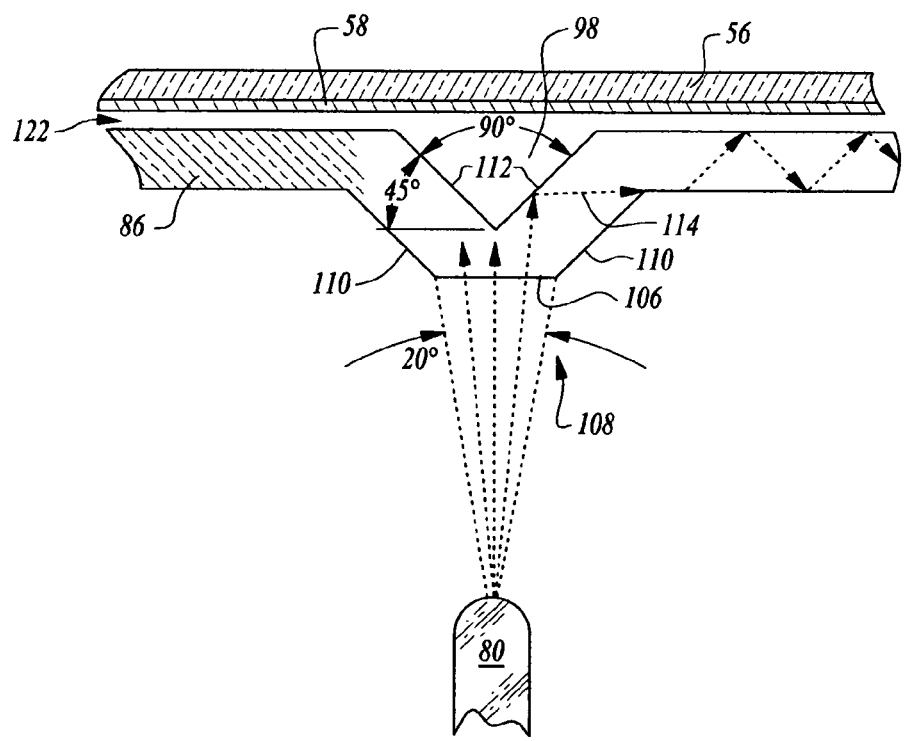
FIG. 10 is a close up cross sectional view through the light guide, cone and cover of the inventive temperature display device.

Referring now to FIG. 10, the conical cavity 98 and beveled plateau 106 are positioned directly above the LED light source 80 so as to capture as much radiant light as possible. The light source 80 is preferably an LED capable of emitting a wide range of colors. LEDs known in the art as high-flux, "Pirahna"-style LEDs, which employ light chips corresponding to the primary colors of red, blue and green are optimum for this application. The flat bottom surface of the inverted plateau 106 is positioned as close as possible to the top of the LED 80 without causing interference. The base diameter of the inverted conical cavity 98 is designed to capture an emitted light cone 108 from the LED 80 having a critical angle of 20° or less. The closer the match between the base diameter of the emitted light cone 108 projected on the light guide 86 and the base diameter of the inverted cone 98, the greater the efficiency of the light guide and therefore the more light captured. The bottom surface of the inverted plateau 106 is round and the beveled sides 110 are preferably angled at 45 degrees, the same as the cone cavity sides 112. The beveled sides 110 serve to extend the light guide 86 downward adjacent to the inverted conical cavity 98 to capture the emitted light 108. The conical cavity 98 has a spanning angle of 90 degrees, which places both the cavity sides 112 and the beveled plateau sides 110 in a parallel 45 degree orientation. The beveled sides 110 also maintain the thickness of the light guide 86, which must be uniform throughout, in order to carry the light 114 from the emitted light cone 108 to the exterior edge 102 of the light guide 86. The thickness of the light guide 86 is chosen based upon the wavelengths of light that are desired to be carried from the light cone 108 to the exterior edge 102 of the light guide 86. The present invention is designed to carry all portions of the visible light spectrum, and therefore represents an average thickness, which is capable of carrying all emitted wavelengths of this portion of the spectrum. This allows any type of colored light to be carried; because as noted previously, the various colored light represents different refrigeration conditions as well as functional modes of the inventive display device 14. In the preferred embodiment, a thickness of about 1.8 mm has been found to meet these parameters.

The light guide 86 causes incident light 114 received from the LED 80 to be redirected laterally through the body of the light guide. As seen in FIG. 9, when light 114 from the emitted light cone 108 meets the beveled side 112 of the inverted conical cavity 98, it is laterally redirected. This light 114 bounces in a lateral direction through the light guide 86 until it meets the exterior edge 102 of the light guide. An arcuate bottom side 116 of the exterior edge 102 causes the laterally traveling light 114 to be scattered (indicated by multiple dashed lines) from the light guide 86 at various angles along the arc 116. This released light radiates through the frosted exterior edge 104 of the light cover 56, which has top 118 and side 120 light radiating surfaces.

The exterior edge 104 of the light cover 56 engages with the exterior edge 102 of the light guide 86 in a snap-fitting relation. The light guide 86 and cover 56 fit together to create an air gap 122 between the top surface of the light guide 86 and the bottom surface of the cover 56. This air gap 122 must be maintained; if anything touches the top surface of the guide 86 it will change the refractive index of the guide and therefore degrade its performance.

The light reflective lexan label 58 helps reflect escaped light back into the light guide for redirection to the exterior edge 102 of the light guide 86, thus ensuring that more light per unit of time reaches the exterior edge, thus improving the visual effect of the radiant ring of light emitting from the device 14. When the cover 56 is engaged upon the light guide 86, the radiant ring of light 124 is emitted in a radial, 360° manner. FIGS. 5A and 5B show how this radial emission of light 124 can be seen from both the front and side of the device. This multi-dimensional aspect allows store personnel to view the display device 14 from front or side angles. Therefore, the inventive device 14 obviates the need for store personnel to walk directly up to the front of each cold case 12 to view the display 64 to determine the condition of a cold case 12. Instead, the condition of a row 16 of cold cases 12 can be determined at a glance by passing store personnel who are aware of the meaning of the various colored lights radiating from the devices 14.

The display device 14 and wireless monitoring system 10 can be modified in various ways by one skilled in the art in order to adapt the device for a multitude of different functioning scenarios. For example, the device 14 can be hardwired into the power system of a retail establishment through a two-wire connection or else the device can operate on battery power. A piezoelectric speaker can be incorporated into the circuit board 72 of the device 14 to provide an audible alarm in addition to the visible light ring 124. Moreover, the display device 14 can be used in other scenarios where temperature sensing is necessary outside of a refrigeration environment. Because the display device can operate in a stand-alone fashion, it could see application in temperature-sensitive scientific research experiments; in agriculture to prevent the spontaneous combustion of hay; in the building trades to prevent fires due to overheated electrical circuits or enclosed machinery. These and other applications would be possible by programming the device software to react to different temperature set points which are appropriate to a particular application.

Finally, although the description above contains much specificity, this should not be construed as limiting the scope of the invention, but as merely providing illustrations of some of the presently preferred embodiments of this invention. This invention may be altered and rearranged in numerous ways by one skilled in the art without departing from the coverage of any patent claims which are supported by this specification.

The invention claimed is:

1. A temperature display and alarm device, comprising:
a microprocessor;
a serially addressed temperature sensor, said temperature sensor transmitting temperature data to said microprocessor;
a display screen for displaying temperature data relayed from said microprocessor;
a light source, said light source being activated by said microprocessor to indicate a plurality of temperature conditions;
a light guide, said light guide receiving incident light from said light source and redirecting said light through said light guide in a direction exterior to said light source, said light guide having an exterior light-dispersive edge for receiving said redirected light from said light source and radially dispersing said light around said guide; and
a cover, said cover engaging with said exterior edge of said light guide, said engagement leaving an air gap between a top surface of said light guide and a bottom surface of said cover, said cover further comprising a translucent, textured exterior edge for emitting dispersed light received from said exterior edge of said light guide.

2. The temperature display and alarm device as recited in claim 1, wherein said translucent edge of said cover emits the dispersed light radially around said device.

3. The temperature display and alarm device as recited in claim 1, wherein said translucent edge of said cover multi-dimensionally emits the dispersed light.

4. The cover as recited in claim 1, further comprising a light-reflective center portion extending across the surface of said cover, said light-reflective center portion terminating at said translucent edge.

5. The cover as recited in claim 4, further comprising a window for viewing said display screen.

6. The light guide as recited in claim 1, further comprising a light-redirecting region, said light-redirecting region comprising: a conical cavity extending downward toward an inverted plateau, said inverted plateau extending downward from a bottom surface of said light guide directly below said cavity, said cavity further comprising angled surfaces for deflecting incident light from said light source and directing it toward said exterior edge of said light guide.

* * * * *